United States Patent [19]

Bergman et al.

[11] 4,074,575
[45] Feb. 21, 1978

[54] TEMPERATURE AND FAILURE INDICATING PROBE FOR A BEARING

[75] Inventors: Mark Otho Bergman; Paul Clement Rentmeester, both of La Crosse, Wis.

[73] Assignee: The Trane Company, La Crosse, Wis.

[21] Appl. No.: 731,857

[22] Filed: Oct. 12, 1976

[51] Int. Cl.² .......................... G01K 1/08; H01H 3/16
[52] U.S. Cl. ........................................ 73/344; 73/351; 200/61.4; 340/269
[58] Field of Search ............... 73/86, 344, 351, 343 R; 200/61.4, DIG. 13; 340/52 A, 57, 231, 269

[56] References Cited

U.S. PATENT DOCUMENTS

| | | | |
|---|---|---|---|
| 2,742,756 | 4/1956 | De Boisblanc | 73/344 X |
| 3,183,043 | 5/1965 | Creeger et al. | 308/1 |
| 3,508,241 | 4/1970 | Potter | 340/269 |
| 3,580,078 | 5/1971 | MacKenzie | 73/344 |
| 3,657,640 | 4/1972 | Jelinek et al. | 73/344 X |

*Primary Examiner*—Richard C. Queisser
*Assistant Examiner*—John S. Appleman
*Attorney, Agent, or Firm*—Peter D. Ferguson; Carl M. Lewis

[57] ABSTRACT

The disclosed invention relates to a combination temperature and failure indicating probe for use in a bearing. In the preferred embodiment, a negative coefficient thermistor is disposed within a tubular, electrically conductive, enclosure. The enclosure is surrounded by an electrically insulating sleeve for mounting within a bearing. Electrical conductors connected to the thermistor and to the enclosure itself lead to a resistance sensor which detects an abnormal resistance due to either:

1. an excess temperature at the bearing; or
2. contact by a metallic portion of the bearing with the enclosure due to bearing wear or failure.

6 Claims, 5 Drawing Figures

TEMPERATURE AND FAILURE INDICATING PROBE FOR A BEARING

BACKGROUND OF THE INVENTION

1. Field of the Invention

The design of large rotary machinery necessarily includes the provision of one or more journal bearings in order to support various rotating components of the machine and one or more thrust bearings to absorb the axial thrust loads which are imposed thereon. Such bearings must be supplied with suitable quantities of lubricating oil under pressure in order to establish a hydrodynamic film between the bearing surface and the rotating element.

In the event that loads in excess of that for which a particular bearing is designed are encountered, or upon a lack of sufficient lubricating oil at a bearing surface, high temperatures may be generated due to frictional forces which, if allowed to continue, would result in bearing failure and consequent serious damage to the machine.

Further, it is possible that, through ordinary wear, a bearing surface may become worn to such an extent as to represent a hazard to further operation of the machine.

Should either of the above-enumerated conditions exist in a machine during its operation, it would be desirable to shut the machine down and remedy the malfunction before the bearing fails completely, possibly resulting in serious and expensive damage to other parts of the machine. It is this problem to which the present invention is addressed, providing a probe which is disposed within a bearing at a location where it senses both bearing temperature and physical contact with a portion of the bearing in the event of excess wear or failure.

2. Description of the Prior Art

The prior art has recognized the problem of excess bearing temperature and includes various schemes for sensing same. For example, U.S. Pat. Nos. 2,961,875, and 3,052,123 show electrical temperature sensing elements disposed within a bearing at a location where they are responsive to excess bearing temperature. It should be noted, however, that none of these patents include the further capability to sense bearing wear or failure. Moreover, applicants are not aware of any prior art bearing probe which includes these combined features.

Although applicants are aware of prior art in which a probe is provided to sense bearing failure (see U.S. Pat. Nos. 3,508,241 and 3,897,116), these are comparatively complicated devices and, more importantly, do not include means for sensing bearing temperature as well.

SUMMARY OF THE INVENTION

The present invention provides a bearing probe of simple, low cost construction yet which includes the capabilities to sense both bearing temperature and bearing wear or failure.

The probe includes a temperature sensing element, preferably of the resistive type, for producing a first electrical signal. This element is supported by an enclosure of electrically conductive material which is thus capable of receiving a second electrical signal indicative of bearing wear or failure. Electrical conductors are connected to both the temperature sensing element and to the enclosure in order to carry the first and second signals to a point of use. The enclosure is provided with electrically insulating mounting means for installing the probe in a bearing.

Accordingly, it is an object of the present invention to provide a probe for use in a bearing which includes the combined capabilities of sensing bearing temperature and bearing wear or failure.

It is a further object of the invention to provide a probe as described above which is simple in construction and therefore inexpensive, yet which performs its intended functions in a reliable manner.

It is a further object of the invention to provide a probe which is readily installed in commercially available bearings, requiring minimum alterations to existing machine designs so as to be easily adaptable thereto.

These and other objects of the invention will become apparent from the following description of a preferred embodiment and by reference to the accompanying drawings.

DESCRIPTION OF A PREFERRED EMBODIMENT

Figure 1:
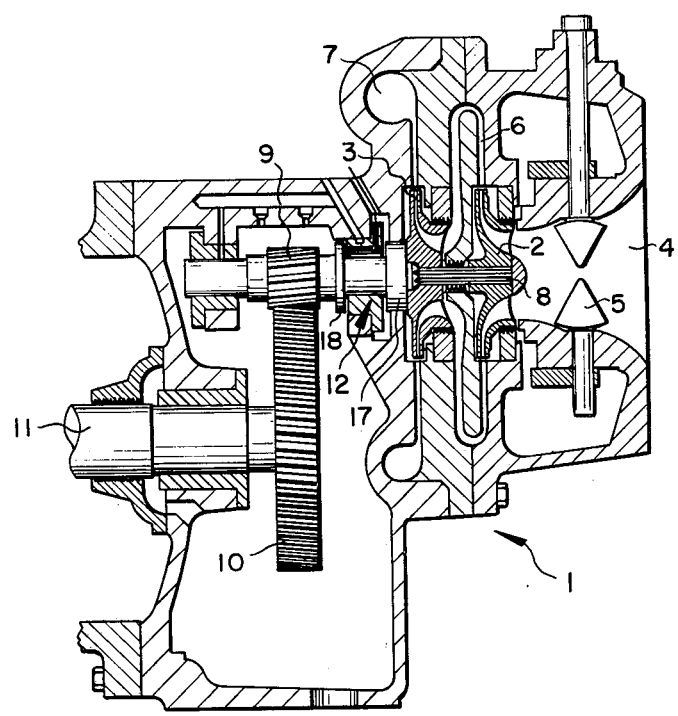
FIG. 1 is a cross-sectional view of a centrifugal gas compressor embodying the present invention.

Referring to FIG. 1, there is shown a partial cross-sectional view of a centrifugal gas compressor which is an example of but one of many applications for the present invention. The compressor as shown is of the two-stage type, including first and second stage impellers 2 and 3, respectively. Gas to-be-compressed enters via a suction chamber 4, under control of prerotation guide vanes 5, and traverses a path including impeller 2, intermediate passage 6, impeller 3, and discharge volute 7.

As is evident from FIG. 1, impellers 2 and 3 are secured to a shaft 8 for rotation therewith, which shaft is driven by a pinion 9 and drive gear 10. Drive shaft 11 is connected to a prime mover, such as an electric motor or turbine in order to impart rotary motion thereto.

Supporting shaft 8 for rotation and for absorbing the axial thrust developed by impellers 2 and 3 during operation is a bearing assembly indicated generally at 12. Since the structure described thus far is well-known in the art and easily understood by those of ordinary skill in the art, no further description of the general compressor structure is deemed necessary. Moreover, as pointed out above, this represents but one of many possible applications for the present invention.

Figure 2:
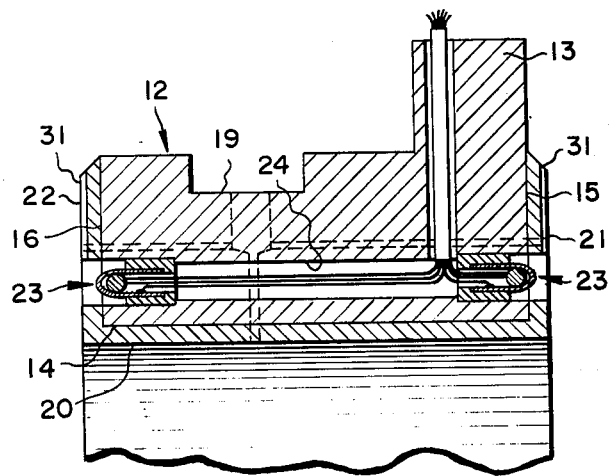
FIG. 2 is a detailed cross-sectional view of a bearing from the compressor of FIG. 1.

Turning now to FIG. 2, there is shown a detailed cross-section of bearing 12, including the probe of the present invention. Bearing 12 includes a main or body portion 13 defining a bore 14 and opposed thrust surfaces 15 and 16. Bonded to bore 14 and surfaces 15, 16 is a layer of babbitt material which defines journal 20 of the bearing and thrust contact surfaces 21, 22. As seen in FIG. 1, shaft 8 is rotatably supported by journal 20 and further includes thrust runners 17, 18 secured thereto in abutting relationship to contact surfaces 21, 22. Bearings of this type are commercially available and well-known in the art.

During operation, lubricating oil under pressure is supplied to annular groove 19 of bearing 12 and distributed via radial bores to journal 20 and via axial bores to thrust contact surfaces 21, 22; as shown in phantom in FIG. 2. In this manner, a hydrodynamic oil film is set up between the rotating surfaces which protects them from wear due to friction and its attendant heat build-up.

In the event that a load is placed on compressor 1 which exceeds its rated load, the aforementioned oil film may break down, resulting in the frictional generation of heat at the bearing surfaces which, if allowed to continue, would result in complete bearing failure and possible serious damage to other components of the compressor. Alternatively, a blocked lubricating passage could produce the same result. Other possibilities of bearing failure are presented if the babbitted surfaces of the bearing wear to an undesirable minimum thickness, or if a defective bearing experiences mechanical failure during operation.

Should any of the foregoing occur, it is desirable that the compressor be shut down immediately in order to prevent serious damage thereto. The present invention addresses this problem through the provision of two bearing probes, indicated generally at 23 (FIG. 2). As shown, the probes are disposed within an axial bore 24 which extends the length of the bearing. Each probe is located such that its end is spaced a predetermined distance from the plane defined by thrust contact surfaces 21, 22; for reasons which will appear hereafter.

Figure 4:
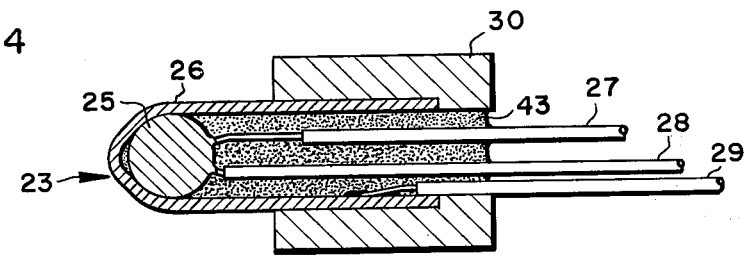
FIG. 4 is a detailed cross-sectional view of one embodiment of the bearing probe which utilizes three electrical leads.
Figure 5:
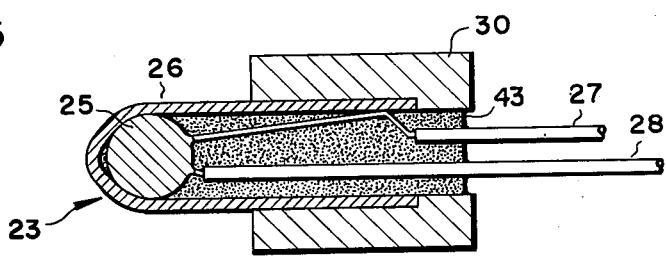
FIG. 5 is a detailed cross-sectional view of a second embodiment of the bearing probe which utilizes only two electrical leads.

At this time, reference may be had to FIGS. 4 and 5 for a detailed description of probes 23.

As seen in FIG. 4, probe 23 comprises temperature sensing means 25 in the form of a resistive element whose electrical resistance changes in response to its temperature, thereby generating a first electrical signal. In a preferred form of the invention, element 25 is a thermistor having a negative temperature coefficient. Surrounding element 25 and supporting same are enclosure means 26 which are constructed of an electrically conducting material, for example, aluminum or stainless steel. The preferred form for means 26 is illustrated as a tubular element having a closed end adjacent thermistor 25 and an opposite open end. It will be appreciated that the use of conducting material for enclosure means 26 will enable it to receive an electrical signal.

Electrical conductor means 27 and 28 lead to thermistor 25 in order to carry its temperature responsive signal to a point of use. As seen in FIG. 4, a third conductor means 29 is shown connected to enclosure means 26 in order to carry any signal which is impressed thereon.

Surrounding enclosure means 26 are mounting means 30 constructed of electrically insulating material such as nylon or a phenolic compound. In this manner, the probe assembly may be press fit into bore 24 (see FIG. 2) such that enclosure means 26 is maintained electrically insulated from metallic, conducting portions of the bearing. Filling the interior of enclosure 26 and that portion of mounting means 30 which extends past its open end, is potting compound 43 which maintains thermistor 25 and conductor means 27-29 in position.

FIG. 5 illustrates a second embodiment of probe 23 wherein like reference numerals have been used to identify like elements. This embodiment differs from that of FIG. 4 in that one of the conductor means 27 which leads to thermistor 25 is also connected to enclosure means 26, thereby obviating the need for a third conductor means. This distinction will be more fully explained with respect to the circuitry shown in FIG. 3.

Considering now the operation of probe 23, it will be appreciated by reference to FIG. 2 that the probes are so located as to be extremely sensitive to temperature changes at surfaces 21, 22. Due to the presence of the aforementioned oil film at surfaces 21, 22, the outer tip of each probe will be surrounded by oil and in intimate heat exchange therewith. In order to provide a continuous flow of oil about the probe, washout grooves 31 are provided for the escape of oil from bore 24 in the vicinity of the probes. Thus, an extremely rapid response time is provided which renders probe 23 very sensitive to changes in temperature at the bearing surfaces.

The second function of probe 23, that of sensing bearing wear or failure should be evident from a perusal of FIG. 2. Since enclosure means 26 (see FIGS. 4 and 5) is electrically insulated from bearing 12, any contact between portions of the bearing and the enclosure may be used to carry a second electrical signal, as by grounding the bearing with respect to the enclosure 26. Should the babbitted surface 21 or 22 wear down to a predetermined minimum thickness, probes 23 will come into contact with thrust runner 17 or 18, respectively. Similarly, if the bearing should experience failure for any reason, contact of probes 23 with any portion thereof would produce the desired result.

A further, unexpected mode of operation was observed during tests of a probe constructed in accordance with the present invention. In this test, the temperature sensing function was overridden and an excessive load placed on the compressor, resulting in babbitted surface 22 being worn at a rapid rate. As this proceeded, small particles of babbitt material, which is usually a mixture of lead and tin, entered bore 24 and bridged the gap between probe 23 and surface 22, resulting in a successful shutdown of the machine.

Figure 3:
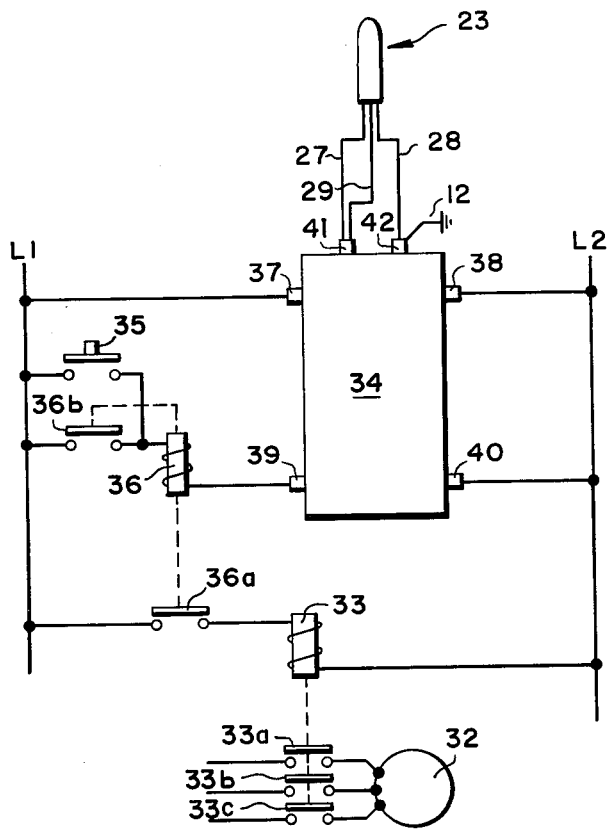
FIG. 3 is a circuit diagram illustrating the operational aspects of the invention.

FIG. 3 illustrates by way of a simple circuit diagram, at least one method of incorporating the bearing probe of the present invention in order to effect machine shutdown. Conductors $L_1$ and $L_2$ represent a current source, as for example, a 115 volt power supply. A compressor driving motor 32 is also shown having its own three-phase power supply under control of contactors 33a, b, c which are actuated by relay coil 33.

Connected between lines $L_1$ and $L_2$ for its power supply at terminals 37, 38, is a resistance sensor 34, which may be a commercially available unit such as Model S-170 made by the National Controls Corp. of Addison, Illinois. Sensor 34 includes a set of relay contacts which are closed upon energization of lines $L_1$ and $L_2$ (assuming normal operating conditions) to provide continuity between terminals 39, 40. Sensor 34 thus operates in a failsafe mode since in the event of a malfunction in its circuitry or a power failure, its relay contacts will open, shutting down motor 32, as will be explained below. In the event that more than a single probe is utilized in a machine, as illustrated in FIG. 2, each probe will be provided with a separate resistance sensor, the relay contacts of each sensor being connected in series with relay coil 36 and its contact 36b.

Probe 23 is connected between terminals 41, 42 of resistance sensor 34, with terminal 42 also being grounded to bearing assembly 12. Sensor 34 therefore sees the lowest resistance between terminals 41, 42. Under normal conditions, this will be the resistance of thermistor 25 at its normal operating temperature since the resistance between enclosure 26 and ground will normally be infinite. It is thus apparent that any drop in the normal sensed resistance due to an increase in temperature (assuming the use of an NTC thermistor) or conduction between enclosure 26 and the bearing body 12 (resulting in essentially zero resistance) will cause sensor 34 to open its contacts between terminals 39, 40.

Relay coil 36, which is energized across terminals 39, 40 will then be de-energized, opening its first set of contacts 36a to de-energize relay coil 33, thereby shutting down motor 32. A second set of contacts 36b will prevent re-energization of motor 32, even if the contacts of sensor 34 close again, until a reset switch 35 is momentarily closed in order to energize relay coil 36.

A careful consideration of FIGS. 3 through 5 will make clear the equivalence of the probe wiring shown in FIGS. 4 and 5. Since enclosure 26 is normally electrically isolated, the connection of thermistor lead 27 thereto (FIG. 5) will be of no effect and resistance sensor 34 will normally see the resistance of thermistor 25. Only when enclosure 26 is grounded to the bearing will the sensed resistance approach essentially zero. From a practical standpoint, the construction of FIG. 4 is preferred in that it is easier to assemble.

Although probes 23 have been illustrated for use with the thrust surfaces of bearing 12, it should be pointed out that, in other situations, the journal surface 20 may be more subject to excess loading, in which case a probe would be disposed radially within the bearing to sense more accurately journal temperature and the condition of its babbitted surface.

From the foregoing description, it should be apparent that the present invention has met the previously enumerated objects in providing a combination temperature and failure indicating probe which is simple in construction, inexpensive, and readily adaptable to most bearings currently in use. It is further noteworthy that the present invention is less complex than many bearing probes of the prior art which were capable of sensing only temperature or wear.

While the invention has been described with respect to a preferred embodiment, it is to be understood that modifications thereto will be apparent to those skilled in the art within the scope of the invention, as defined in the claims which follow.

We claim:

1. A combination temperature and failure indicating probe for use in a bearing, said probe comprising:
   a. temperature sensing means for producing a first electrical signal related to its temperature;
   b. tubular enclosure means having a closed end and an opposite end, said temperature sensing means being disposed therein at a location adjacent said closed end, said tubular enclosure means, including the closed end thereof, being constructed of a material which is electrically conductive and therefore capable of receiving a second electrical signal;
   c. electrical conductor means connected to said temperature sensing means and to said tubular enclosure means for carrying said first and second electrical signals to a point of use; and
   d. mounting means for supporting said tubular enclosure means in a bearing, said mounting means being constructed of electrically insulating material.

2. The combination temperature and failure indicating probe of claim 1 wherein said temperature sensing means comprises a resistive element whose electrical resistance changes in response to its temperature.

3. The combination temperature and failure indicating probe of claim 2 wherein said resistive element is a thermistor having a negative temperature coefficient.

4. The combination temperature and failure indicating probe of claim 2 wherein said electrical conductor means comprise two lead wires to said resistive element and a third wire connected to said tubular enclosure means.

5. The combination temperature and failure indicating probe of claim 2 wherein said conductor means comprise two lead wires to said resistive element, one of said wires being also connected to said tubular enclosure means.

6. The combination temperature and failure indicating probe of claim 1 wherein said mounting means comprises a sleeve which surrounds said tubular enclosure means.

* * * * *

UNITED STATES PATENT OFFICE
CERTIFICATE OF CORRECTION

PATENT NO. : 4,074,575

DATED : February 21, 1978

INVENTOR(S) : Mark O. Bergman and Paul C. Rentmeester

It is certified that error appears in the above-identified patent and that said Letters Patent are hereby corrected as shown below:

In claim 1:

Line 11, following "second" insert --failure-indicating--; following "signal", insert --upon abnormal contact with an electrically conductive portion of a bearing--;

Line 16, following "means", insert --constructed of electrically insulating material--;

Line 17, following "bearing", delete the comma and insert --in a normal condition electrically insulated with respect thereto,--;

Lines 17-18, delete "said mounting means being constructed of electrically insulating material" and insert --whereby said tubular enclosure means serves the dual functions of housing said temperature sensing means for producing a first electrical signal indicative of the temperature of a bearing and, upon abnormal contact with an electrically conductive portion thereof, receiving said second failure-indicating electrical signal, thereby effecting operation of said combination temperature and failure indicating probe--.

Signed and Sealed this

Thirteenth Day of June 1978

[SEAL]

Attest:

RUTH C. MASON
*Attesting Officer*

DONALD W. BANNER
*Commissioner of Patents and Trademarks*